(12) United States Patent
Sbongk

(10) Patent No.: US 7,621,707 B2
(45) Date of Patent: Nov. 24, 2009

(54) FASTENER

(75) Inventor: Albert Sbongk, Niederstetten (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 11/910,041

(22) PCT Filed: Jul. 13, 2006

(86) PCT No.: PCT/IB2006/001938

§ 371 (c)(1),
(2), (4) Date: Sep. 28, 2007

(87) PCT Pub. No.: WO2007/007180

PCT Pub. Date: Jan. 18, 2007

(65) Prior Publication Data

US 2008/0193251 A1 Aug. 14, 2008

(30) Foreign Application Priority Data

Jul. 14, 2005 (DE) .......................... 10 2005 032 699

(51) Int. Cl.
*F16B 37/04* (2006.01)
(52) U.S. Cl. ...................... 411/182; 411/172
(58) Field of Classification Search ................. 411/182, 411/183, 172–175, 177, 508, 349
See application file for complete search history.

(56) References Cited

U.S. PATENT DOCUMENTS 3,444,917 A 5/1969 Bennett (Continued)

FOREIGN PATENT DOCUMENTS

EP 0681110 B1 7/1998

(Continued)

OTHER PUBLICATIONS

ISR mailed Oct. 24, 2006 for PCT/IB06/001938.

*Primary Examiner*—Gary Estremsky
(74) *Attorney, Agent, or Firm*—Lowe Hauptman Ham & Berner, LLP

(57) ABSTRACT

A fastener, for connecting a first component having a first hole to a second component having a second hole, includes a cage which is fitted at its end with a radial flange and further a cross-sectionally rectangular or square shank segment. This shank segment is insertable into the second hole of the second component, for resting against the associated side of the second component. A nut is at least partly axially received in the cage and is rotatable from a first rotational position in the cage into a second rotational position. The nut has an axial borehole to receive an affixation screw and also comprises at its outside the diametrically opposite wing elements, where, upon rotation of the nut from the first into the second rotational position, the wing elements will be pulled on account of the affixation screw's rotation in the nut against the other side of the second component, with a head of the affixation screw resting against the first component and compressing latter against the cage flange. The cage and nut are made of molded plastic. The hole is square or rectangular. The wing elements of the nut are situated in the first rotational position within the contour of the cage and in the second rotational position, will radially project beyond the cage contour against a stop of the cage.

7 Claims, 2 Drawing Sheets

U.S. PATENT DOCUMENTS

| | | | | |
|---|---|---|---|---|
| 4,573,025 A | * | 2/1986 | McKinzie, III | 331/117 D |
| 5,173,025 A | * | 12/1992 | Asami | 411/344 |
| 6,322,305 B1 | * | 11/2001 | Bantle | 411/41 |
| 6,560,819 B2 | * | 5/2003 | Mizuno et al. | 16/2.2 |

FOREIGN PATENT DOCUMENTS

| | | |
|---|---|---|
| FR | 2544411 A | 10/1984 |
| FR | 2613439 A | 10/1988 |

* cited by examiner

FASTENER

RELATED APPLICATIONS

The present application is based on International Application No. PCT/IB06/001938 filed Jul. 13, 2006, and claims priority from German Application Number 10 2005 032 699.4, filed Jul. 14, 2005, the disclosures of which are hereby incorporated by reference herein in their entirety.

TECHNICAL FIELD

The present invention relates to a fastener to connect a first structural part, hereafter first component, to a second structural part, hereafter second component.

BACKGROUND

A fastener of this kind is known from the European patent document EP 0 681 110 B1. It comprises two molded metal parts, one being a cage and the other a nut. The cage is fitted with a radial flange resting against one side of a component as its shank is inserted through said component's hole. Said shank is cross-sectionally square and tapers away from the flange. The hollow cage receives the nut which substantially consists of a nut thread and two mutually opposite wing elements. Within the cage, the nut may be pivoted by nearly 90°, said wing elements when being rotated moving along ramp faces until coming to rest against an axis-parallel surface of the cage. The component's affixing hole is similar to a keyhole to allow inserting the wing elements together with the cage into said hole. When an affixation screw is rotated into the nut's thread, said nut shall be pivoted as cited above and shall be moved along said ramp face. As a result the device as a whole no longer can be pulled out of the hole. As the affixation screw is tightened further, the upper surface of each wing element will be clamped against the component opposite it. This fastener design entails complex manufacture and requires a special hole contour.

Moreover the state of the art comprises various dowel designs for inserting said dowels into holes in components such as automobile bodies. By appropriately turning a screw, expansion ensues to produce frictional connection. Such dowels are disclosed in the patent documents DE 931 81 22 U1, FR 2,122,781 A1, U.S. Pat. No. 3,478,395 or GB 2,242, 928 A.

SUMMARY

The objective of the present invention is to improve a fastener of the initially cited kind so that it may be manufactured economically and be easier to mold.

As regards the fastener of the present invention, the cage and nut are made of plastic and preferably are integral, though their junction allows shearing them apart to allow moving them into their assembly position.

Furthermore, in the present invention, the nut wing elements are configured at the first rotational position within the cage contour, this cage together with its received nut thereby being easily insertable into a rectangular/square hole. When the nut is being rotated due to rotating the affixation screw, the said wing elements will move out the cage contour and then pivot against a stop. Upon further rotation of the affixation screw, the nut is then displaced axially toward the cage flange until the upper wing element faces shall make contact with the associated component's surface and in this manner both the nut and the cage shall have been affixed to the said component. The wing elements run approximately diagonally to the cage in the first rotational position and therefore remain within said cage's cross-sectional contour.

The fastener of the present invention offers several advantages. It enables a geometrically (positively) interlocking connection free of play. It may be manufactured at low cost, in particular by integral injection molding. The fastener of the present invention allows high clamping forces and low assembly stresses. Moreover it allows large component tolerances.

In one embodiment mode of the present invention, the nut comprises a cylindrical segment situated between said nut wing elements and fitted with an annular collar at the cage's end opposite the cage. Said cylindrical segment may be inserted into the cage, in which event the collar cooperates with a peripheral inner cage shoulder. As a result the nut shall be locked in the cage though it still may be rotated to a limited extent about its axis. Preferably said collar is fitted with a conical, external face allowing inserting the cylindrical segment into a partly cylindrical passage in the cage. Upon insertion of the annular collar, said passage in the cage may temporarily be expanded slightly until the said collar shall be situated above said shoulder.

In a further embodiment mode of the present invention, the cage comprises a clearance at its end opposite the flange and the nut is fitted with a locking segment running parallel to its axis, this locking segment engaging the said clearance in locking manner when the wing elements are tightened from the second rotational position against the said second component, the nut being hampered thereby from rotating back toward the first rotational position. The said locking segment may be fitted with a ramp face cooperating with an edge of said clearance in a manner that the particular wing element shall be forced against the said stop as the locking segment enters the clearance. As a result playless locking has been attained that shall remain effective even in the presence of vibrations or shocks.

Lastly in another embodiment mode of the present invention, the cage may comprise at least one barb-shaped, deforming protrusion at its external side, said protrusion being temporarily deformed when the cage is inserted into the second hole and cooperating in locking manner with the opposite side of the said second component if the attempt were made to pull the cage out of the hole.

BRIEF DESCRIPTION OF THE DRAWINGS

The present invention is elucidated below by means of an illustrative embodiment shown in the appended drawings.

DETAILED DESCRIPTION OF EMBODIMENTS

Figure 1:
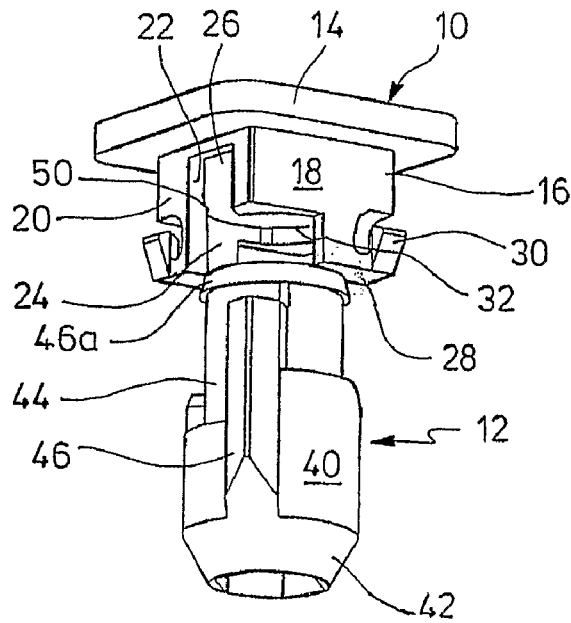
FIG. 1 is a perspective view of a molded fastener of the invention.

The fastener shown in FIGS. 1 through 6 comprises a cage 10 and a nut 12. The cage 10 is fitted with a rectangular flange 14 and a cross-sectionally square shank 16. The shank is fitted with two mutually opposite and continuous rectangular side faces 18 and two other mutually opposite side faces 20 that are interrupted by a clearance 22, FIGS. 1 through 6 each show only one face 18 or 20. It is understood that the particular opposite face is identical.

As shown in particular in FIG. 1, the shank 16 is substantially hollow and bounded by inner, cylindrical surfaces. The diameter of a first cylindrical surface 24 is slightly smaller than that of the upwardly adjoining cylindrical surface 26 running toward the flange 14. As shown, the cylindrical surface 24 is interrupted by the clearances 26.

At its end opposite the flange 14, the shank 16 is fitted with a downward-pointing protrusion 28 comprising an elastic tip 30. A clearance 32 is constituted in this manner in the walls 18.

The nut 12 comprises a lower cylindrical segment 40 merging downward into a conical segment 42. It also comprises an adjoining upper cylindrical segment 44 of which the top end is integral with an annular collar 46a. The diameter of the cylindrical segment 44 is less than that of the cylindrical segment 40. Mutually opposite and substantially cross-sectionally triangular wing elements 46 are integral with the two cylindrical segments 40, 44.

FIG. 1 shows the state of the fastener shown in FIGS. 1 through 6 following its injection molding manufacture. The nut 12 is connected in severable manner by the collar 46a to the lower end of the cage 10. While the position of the cage 10 remains unchanged, the nut 12 is driven, by an impact on its lower end, into the shank 16 of the cage 10. The collar 46a is externally conical and its diameter at the its maximum-diameter end is larger than the diameter of the cylindrical surface 24. Because said surface 24 is only partly annular, it is elastically yielding and consequently the collar 46a is inserted in relatively easy manner until it spans the shoulder 50 constituted between the cylindrical surfaces 24, 26. Henceforth the nut no longer can be pulled out of the shank 16.

In the above described assembly, the wing element 46 points at one corner of the shank 16, the radial configuration of the wing element 46 being such that the corner edges of the shank 16 and wing element 26 merge into each other. As a result the wing element contour 46 does not project beyond the contour of the shank 16.

Figure 2:
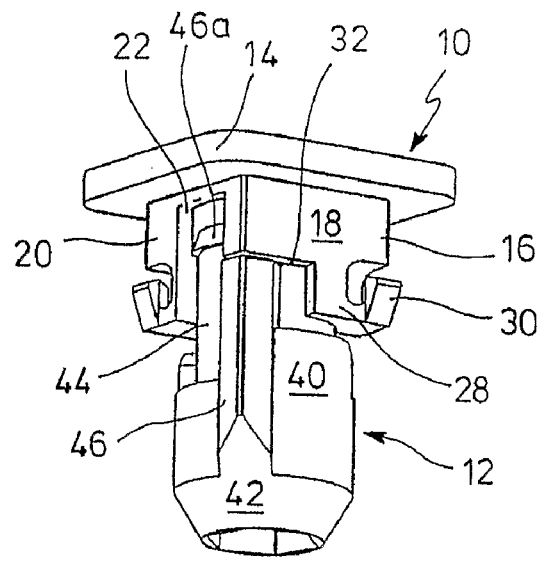
FIG. 2 shows the fastener of FIG. 1 after the lower not was inserted into the upper cage.
Figure 3:
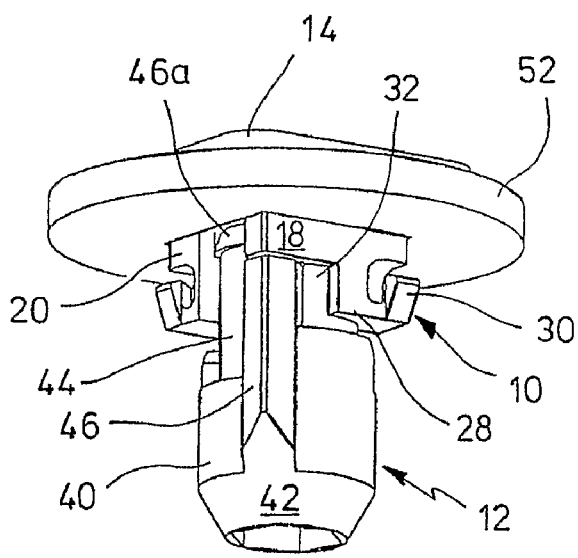
FIG. 3 shows the configuration of the fastener of FIG. 2 inside a hole of the component.

The nut 12 assumes a first rotational position relative to the cage 10 in the assembly position of FIG. 2 and is being inserted into a square hole of a component 52 (FIG. 3). In the process, the tips 30 slightly projecting sideways beyond the faces 18 will temporarily deform. Thereafter they will resume their initial position. Therefore the fastener as a whole is not easily extracted from, or cannot easily drop out the square hole when overhead assembly is desired.

Figure 4:
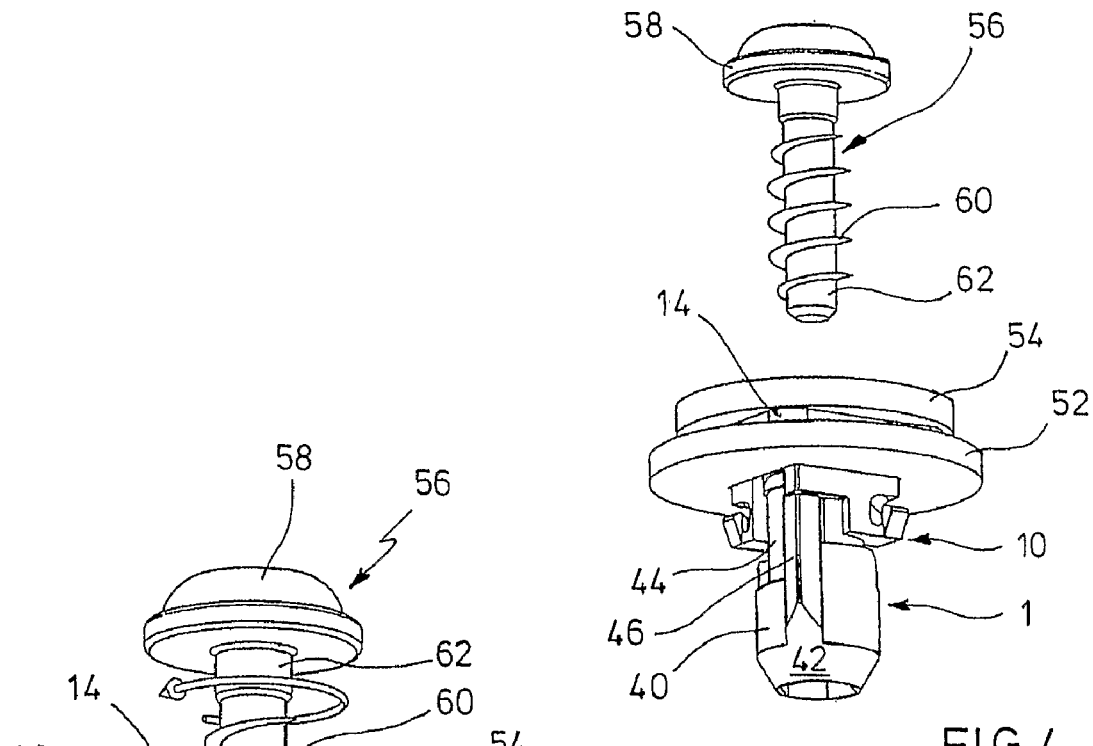
FIG. 4 shows the configuration of FIG. 3 for a second component and an affixation screw.

FIG. 4 shows a further component 54 resting on the flange 14 which in turn rests on the top side of the planar component 52. The component 54 also comprises a hole which however is preferably circular. This hole is aligned with the axis of the square hole of the component 52. Thereupon an affixation screw 56 is inserted. The affixation screw 56 comprises a head 58 and a shank 62 with a plastic thread 60.

The nut 12 comprises an axially continuous passage of circular or other cross-section that is able to receive the affixation screw 56 tapping a thread into the nut.

Figure 5:
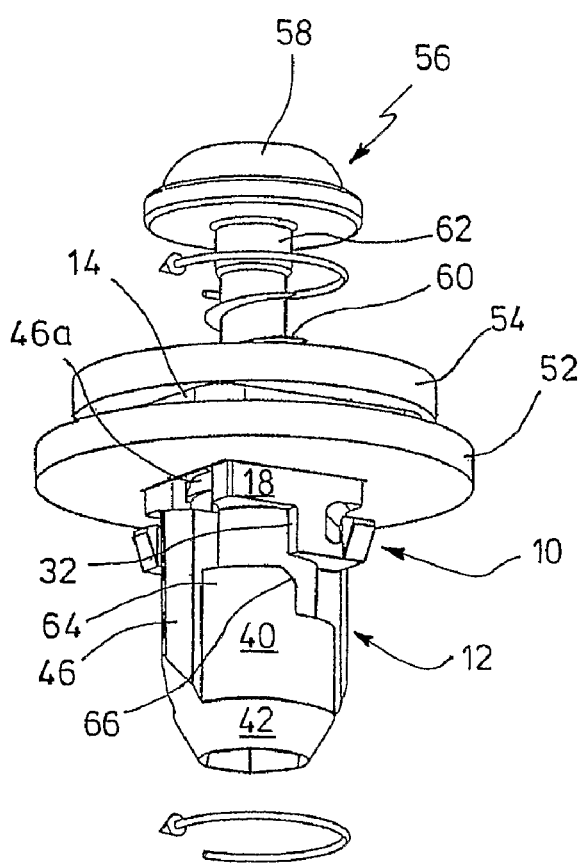
FIG. 5 shows the affixation screw being turned into the configuration of FIG. 4.

When, as shown in FIG. 5, the affixation screw is screwed into the nut 12, said nut shall be rotated clockwise on account of the deforming stresses. The angle of rotation is about 40 to 50°, the wing elements 46 coming to a stop against the associated sidewall of the clearances 22. In this second rotational position of the nut 12 relative to the cage 10 the wing elements 46 do radially project beyond the contour of the shank 16.

FIG. 5 moreover shows the cylindrical segment 40 being fitted at mutually opposite sides with an upward pointing locking segment 64 which is externally cylindrical and constitutes an axially parallel shoulder relative to the cylindrical segment 44. The locking segment 64 shown in FIG. 5 points toward the clearance 32. When the affixation screw 56 is tightened further, the nut 12 will move axially into the cage 10. An oblique face 66 at the locking segment 64 slides along the opposite lower edge of the clearance 32, whereby the nut 12 rotates even farther clockwise and the wing elements 46 are compressed hard against the associated faces of the clearance 22. Consequently the nut 12 is prevented from rotating back.

Figure 6:
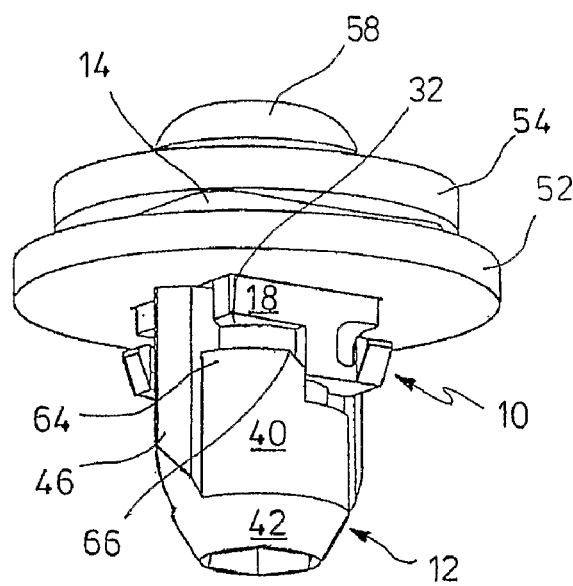
FIG. 6 shows the fastener's completed affixation to two components.

The nut 12 is displaced axially into the cage 10 until the surface (not shown above) of the wing elements 46 engages the facing surface of the component 52 as shown in FIG. 6.

A geometrically interlocking (positive) connection free of play is created between the components 52, 54 and provides affixation forces. The force which must be applied during assembly are low. Large thickness tolerances in the planar components 52, 54 can be absorbed.

Be it also borne in mind that when the nut 12 is inserted into the cage 10, deeper axial displacement of the nut 12 into the cage is prevented by the cooperation between the upper surface of the wing elements 46 with the opposite wall face of the clearance 32. In this manner the nut 12 is received and locked in the cage 10. Said nut 12 can be displaced deeper into the cage 10 only after the wing element 46 has been aligned with the clearance 22.

The invention claimed is:

1. A fastener, for connecting a first component having a first hole to a second component having a second hole, comprising:
   a cage which is fitted at its end with a radial flange and further a cross-sectionally rectangular or square shank segment, said shank segment being adapted for insertion into the second hole of the second component, said flange being adapted to rest against a side of the second component,
   a nut that is at least partly axially received in the cage and that is rotatable from a first rotational position in the cage into a second rotational position and moreover is fitted with an axial borehole adapted to receive an affixation screw and also comprises at its outside, diametrically opposite wing elements, where, upon rotation of said nut from the first rotational position into the second rotational position, said wing elements will be pulled, on account of the affixation screw's rotation in the nut, against the other side of the second component, a head of said affixation screw are adapted to rest against the first component and compress the first component against the flange,
   wherein the cage and nut are made of molded plastic, the second hole is adapted to be square or rectangular and the wing elements of the nut are situated in the first rotational position within a contour of the cage and in the second rotational position, will radially project beyond the cage contour against a stop of the cage; and
   wherein the nut further comprises a cylindrical segment between the wing elements, said cylindrical segment comprising at its end facing the flange an annular collar and the cylindrical segment being insertable into the cage, where the collar cooperates with a peripheral inner shoulder of the cage, as a result of which the nut is rotatably supported between the rotational positions.

2. Fastener as claimed in claim 1, wherein the annular collar is fitted with an external, conical face, the cylindrical segment being insertable by means of said collar into a partly cylindrical passage of the cage.

3. Fastener as claimed in one of claim 1, wherein the nut and the cage are molded separately.

4. Fastener as claimed in claim 1, wherein the nut is molded integrally with the cage but may be sheared off the cage, the integrated nut being situated in the first rotational position relative to the cage.

5. Fastener as claimed in claim 1, wherein the cage is fitted with a least one protrusion at its external side, said protrusion being temporarily deformed when the cage is inserted into the second hole and abutting the second component facing it if subjected to a force to pull the fastener out of said second hole.

6. A fastener, for connecting a first component having a first hole to a second component having a second hole, comprising:

- a cage which is fitted at its end with a radial flange and further a cross-sectionally rectangular or square shank segment, said shank segment being adapted for insertion into the second hole of the second component, said flange being adapted to rest against a side of the second component,
- a nut that is at least partly axially received in the cage and that is rotatable from a first rotational position in the cage into a second rotational position and moreover is fitted with an axial borehole adapted to receive an affixation screw and also comprises at its outside diametrically opposite wing elements, where, upon rotation of said nut from the first rotational position into the second rotational position, said wing elements will be pulled on account of the affixation screw's rotation in the nut, against the other side of the second component, a head of said affixation screw being adapted to rest against the first component and compress the first component against the radial flange,
- wherein the cage and nut are made of molded plastic, the second hole is square or rectangular and the wing elements of the nut are situated in the first rotational position within a contour of the cage and in the second rotational position, will radially project beyond said cage contour against a stop of the cage; and
- wherein the shank is fitted with a clearance at its end opposite the flange and the nut comprises an axis-parallel locking segment running in the direction of the cage and engaging the clearance in a locking manner when the wing element nuts are pulled toward the second component, thereby precluding the nut from being rotated back toward the first rotational position.

7. Fastener as claimed in claim 6, wherein the locking segment is fitted with a ramp face cooperating with an edge of the clearance in a manner that the wing elements are compressed against the associated stops when the locking segment enters the clearance.

* * * * *